(12) United States Patent
Grochowski et al.

(10) Patent No.: US 6,205,542 B1
(45) Date of Patent: *Mar. 20, 2001

(54) PROCESSOR PIPELINE INCLUDING REPLAY

(75) Inventors: Edward T. Grochowski, San Jose; Derrick C. Lin, Foster City, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,426

(22) Filed: Jan. 14, 1999

Related U.S. Application Data

(63) Continuation-in-part of application No. 08/998,341, filed on Dec. 24, 1997, now Pat. No. 6,076,153.

(51) Int. Cl.[7] .................................................. G06F 9/38
(52) U.S. Cl. .................................... 712/219; 712/23
(58) Field of Search ............................ 712/23, 9, 215, 712/219

(56) References Cited

U.S. PATENT DOCUMENTS

| | | | |
|---|---|---|---|
| 4,920,477 | * 4/1990 | Colwell | 711/207 |
| 5,012,403 | 4/1991 | Keller et al. . | |
| 5,297,263 | * 3/1994 | Ohtsuka | 712/244 |
| 5,307,477 | * 4/1994 | Taylor | 711/3 |
| 5,421,022 | 5/1995 | McKeen et al. . | |
| 5,428,807 | 6/1995 | McKeen et al. . | |
| 5,584,037 | 12/1996 | Papworth et al. . | |
| 5,584,038 | 12/1996 | Papworth et al. . | |
| 5,659,721 | 8/1997 | Shen et al. . | |
| 5,751,985 | 5/1998 | Shen et al. . | |
| 5,764,971 | 6/1998 | Shang et al. . | |
| 5,765,208 | 6/1998 | Nelson et al. . | |
| 5,784,587 | 7/1998 | Lotz et al. . | |
| 5,787,474 | 7/1998 | Plum . | |
| 5,822,558 | 10/1998 | Tran . | |
| 5,822,574 | 10/1998 | Tran . | |
| 5,870,579 | 2/1999 | Tan . | |
| 5,901,308 | 5/1999 | Cohn et al. . | |
| 5,933,618 | 8/1999 | Tran et al. . | |
| 5,966,544 | * 10/1999 | Sager | 712/32 |
| 5,983,321 | 11/1999 | Tran et al. . | |
| 5,987,594 | * 11/1999 | Panwar | 712/216 |
| 6,047,370 | 4/2000 | Grochowski . | |
| 6,076,153 | 6/2000 | Grochowski et al. . | |
| 6,079,002 | * 6/2000 | Thatcher | 711/169 |
| 6,081,887 | * 6/2000 | Steely | 712/239 |

FOREIGN PATENT DOCUMENTS

WO 98/33116    7/1998    (WO) .

OTHER PUBLICATIONS

PCT International Search Report mailed May 17, 2000 for corresponding International Application No. PCT/US00/00222 (8 pages).

* cited by examiner

Primary Examiner—Eric Coleman
(74) Attorney, Agent, or Firm—Blakely, Sokoloff, Taylor & Zafman LLP

(57) ABSTRACT

The invention provides a method for executing instructions. The method includes dispatching and executing a first and second plurality of instructions in a portion of a pipeline without first determining whether stages of the portion of the pipeline are ready. The method further includes determining if an execution problem is encountered and replaying the first plurality of instructions in response to determining that the first plurality of instructions encountered an execution problem. The invention also provides a processor pipeline. The processor pipeline includes a front end to fetch a plurality of instructions for execution and a back end to execute the plurality of instructions fetched by the front end. The back end includes a retirement stage to determine if an instruction had an execution problem. The back end is non-stallable. The processor pipeline also includes a channel to send an indication that the instruction encountered an execution problem from the retirement stage to a replay point of the pipeline from which the instruction may be re-executed.

29 Claims, 7 Drawing Sheets

PROCESSOR PIPELINE INCLUDING REPLAY

This patent application is a continuation-inpart application of U.S. patent application Ser. No. 08/998,341, filed Dec. 24, 1997, now U.S. Pat. No. 6,076,153.

BACKGROUND OF THE INVENTION

1. Field of the Invention

This invention relates generally to pipelined processors, and more particularly, to a replay mechanism for a processor pipeline.

2 Description of the Related Art

Computers and many other types of machines are engineered around a "processor" that executes programmed instructions stored in the machine's memory. One may categorize computers and processors by the complexity of their instruction sets, such as reduced instruction set computers ("RISC") and complex instruction set computers ("CISC"). An architecture is a categorization defining the interface between the processor's hardware and the processor's instruction set.

A first aspect of a processor's architecture is whether it executes instructions sequentially or out of order. Historically, processors executed one instruction at a time or in the same sequential order that code for the instructions was presented to the processor. This architecture is the "sequential programming model." An out of order architecture executes instructions in an order different from the order in which the code is presented to the processor, i.e., non-sequentially.

The sequential nature of software code creates "data dependencies" and "control dependencies." A data dependency occurs when a later instruction manipulates an operand x, and the data at x is a result from an earlier instruction. The later instruction has a data dependency on the operand of the earlier instruction. A control dependency occurs when an instruction can generate two alternative branches of instructions only one of which will be executed. Typically, the branch choice depends on a condition. The various architectures respect these data and control dependencies.

A second aspect of a processor's architecture is whether instruction processing is "pipelined." In pipelined processing, the processor fetches instructions from memory and feeds them into one end of the pipeline. The pipeline has several "stages," each stage performing some function necessary or desirable to process the instruction before passing the instruction to the next stage. For instance, one stage might fetch an instruction, the next stage might decode the instruction, and the next stage might execute the decoded instruction. Each stage typically moves the instruction closer to completion.

A pipeline may offer an advantage in that one part of the pipeline is working on a first instruction while a second part of the pipeline is working on a second instruction. Thus, more than one instruction can be processed at a time potentially increasing the effective rate at which instructions are processed.

Some pipelines process instructions "speculatively." Speculative execution means that instructions are fetched and executed before resolving pertinent control and/or data dependencies. Speculative execution predicts how data and/or control dependencies will be resolved, executes instructions based on the predictions, and then verifies that the predictions were correct before retiring the instruction and results therefrom.

The verification step can be a challenge to pipeline design. At the end of the pipeline, the results from executed instructions are temporarily stored in a register until all data and control dependencies have been actually resolved. The pipeline then checks whether any mispredictions or other problems occurred, i.e., both generally referred to as exceptions. In the absence of execution problems, the executed instructions are "retired" and results are stored to architectural registers, an operation referred to as "commitment to an architectural state." If execution problems occur, the processor performs a correction routine.

Execution problems are problems that can result in:

(1) executing an instruction that should not have been executed;

(2) not executing an instruction that should have been executed; or (3) executing an instruction with incorrect data. To process the instruction stream correctly, the effects of execution problems on subsequent execution of instructions must also be corrected.

Many prior art pipelined processors "stall" the pipeline upon detecting an exception. In stallable instruction pipelines, a number of latches or registers govern progress through the stages of the pipeline. A pipeline controller generates a signal to enable or disable the latches or registers. During a stall, the latches or registers are disabled so that the instructions are not transferred to the next stage. After an exception that caused the stall and its effects are repaired, the pipeline controller re-enables the latches or registers and transfers between pipeline stages resume.

To operate a stallable pipeline, the pipeline controller needs to receive status signals from the stages of the pipeline, determine whether to stall from the received signals, and then broadcast a signal to stall or proceed. Since each of these steps takes time, implementing the ability to stall may limit the operating frequency of the pipeline.

Some processor pipelines "replay" in addition to stalling. Replay is the re-execution of instructions upon detecting an exception. If an exception is detected, speculative results are ignored, e.g., the architectural state is not updated and instructions are not retired. The processor corrects the problem and re-executes the instructions.

One processor employing replay is the Alpha 21164 microprocessor, commercially available from Digital Equipment Corporation. The Alpha 21164 stalls only the first three stages of the pipeline. If a problem occurs after the third stage, the Alpha 21164 replays the entire pipeline after the repairing problem. The Alpha 21164 therefore combines expensive stalling with complex decision-making circuitry necessary to determine when to replay. The Alpha 21164 replays the entire pipeline line even though the problem may be localized. Replaying the entire pipeline may be inefficient if there are several parallel execution units, e.g., a superscalar processor, and the problem was localized to one of the parallel execution units.

The demand for faster processors continually outstrips present technology. The demand pressures all aspects of processor architecture to become faster in the sense of higher instruction throughput. Current techniques for handling exceptions in pipelines processing can substantially reduce instruction throughput.

The present invention is directed to overcoming, or at least reducing the effects of, one or more of the problems set forth above.

SUMMARY OF THE INVENTION

The invention, in one embodiment, provides a method for executing instructions. The method includes dispatching and executing a first and second plurality of instructions in a portion of a pipeline without first determining whether stages of the portion of the pipeline are ready. The method further includes determining if an execution problem is encountered and replaying the first plurality of instructions in response to determining that the first plurality of instructions encountered an execution problem.

The invention in another embodiment, provides a processor pipeline. The processor pipeline includes a front end to fetch a plurality of instructions for execution and a back end to execute the plurality of instructions fetched by the front end. The back end includes a retirement stage to determine if an instruction had an execution problem. The back end is non-stallable. The processor pipeline also includes a channel to send an indication that the instruction encountered an execution problem from the retirement stage to a replay point of the pipeline from which the instruction may be re-executed.

BRIEF DESCRIPTION OF THE DRAWINGS

Other objects and advantages of the invention will become apparent upon reading the following detailed description and upon reference to the drawings in which.

Figure 1:
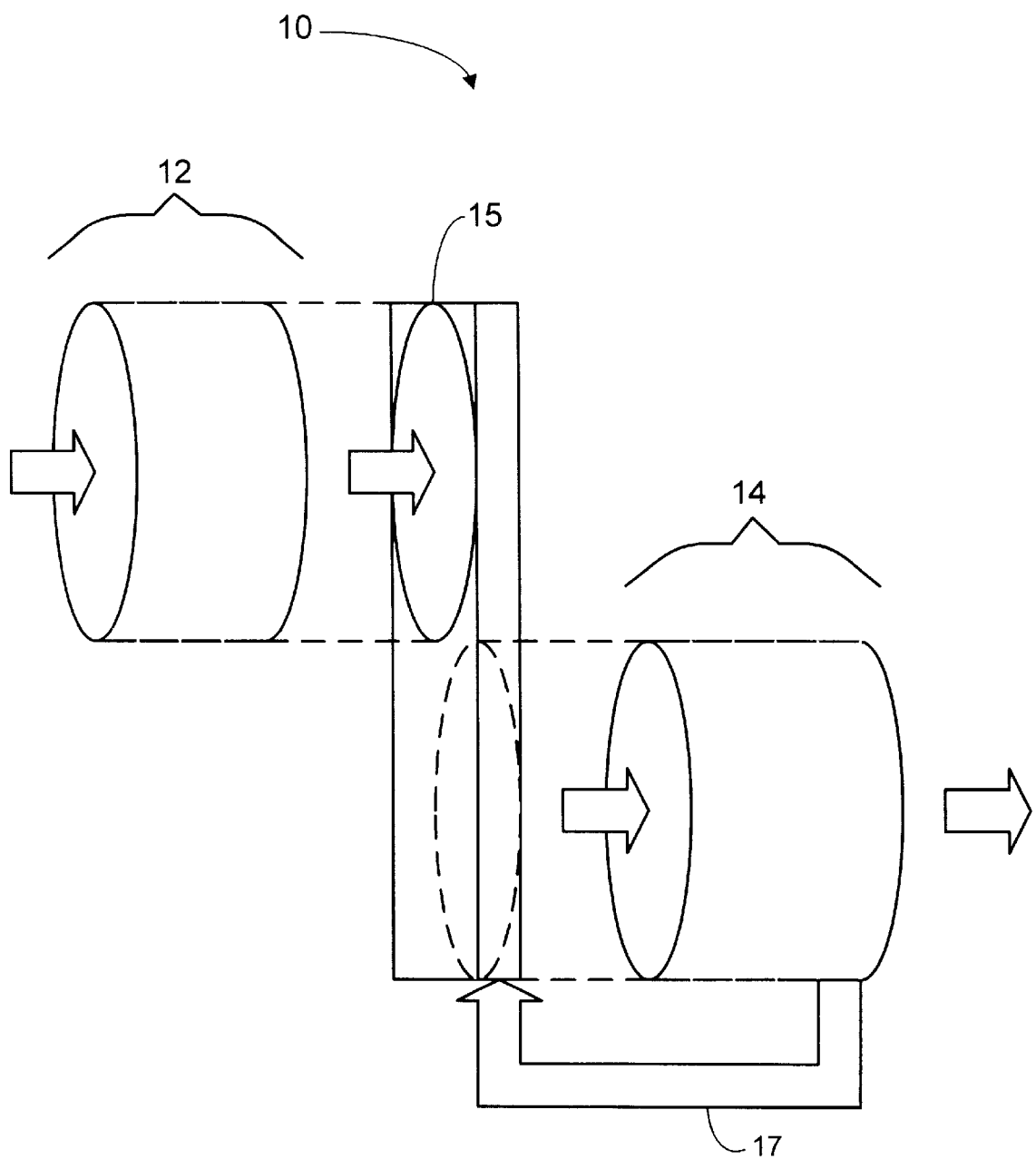
FIG. 1 conceptually illustrates an embodiment of a pipeline constructed and operating according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates an embodiment of a non-stallable processor pipeline 10 constructed and operated in accordance with the present invention. The pipeline 10 generally comprises a front end 12, a back end 14, and a queue 15 located between the front end 12 and the back end 14. The queue 15 is capable of storing an intermediate state of the processor pipeline from which the back end 14 may be replayed in response to a replay a request transmitted over a channel 17.

Referring to FIG. 1, the queue 15 of some embodiments may be a part of the back end 14 rather than separate from the back end 14. For the sake of clarity and to further this disclosure of the invention claimed below, the queue 15 and the back end 14 shall be discussed as separate parts of the pipeline 10. Nevertheless, the invention is not so limited, and the back end 14 may incorporate the queue 15 in some alternative embodiments.

Still referring to FIG. 1, the front end 12 fetches macro-instructions and, in this particular embodiment, generates "micro-ops" therefrom. A micro-op is generally an instruction that may be executed by a single execution unit (not shown) of the processor in one or several clock cycles. Some macro-instructions may comprise several micro-ops. Thus, there may not be a one-to-one correspondence between macro-instructions and micro-ops.

Still referring to FIG. 1, the front end 12 decodes the macro-instructions into micro-ops and stores them into the queue 15. The back end 14 executes the instructions as prepared by the front end 12 and stored in the queue 15. Hereinafter, instructions shall refer to micro-ops or instructions executable on one of the execution units located in the back end 14.

Still referring to FIG. 1, an issue group is a set of instructions or micro-ops, that is dispatched from the queue 15 for parallel execution. Issue groups may have one or more micro-ops. In some embodiments, the micro-ops of an issue group are written to the queue 15 during one clock cycle. The micro-ops stored in the queue 15 define an intermediate state of the pipeline 10 can be replayed as discussed more fully below.

Figure 2A:
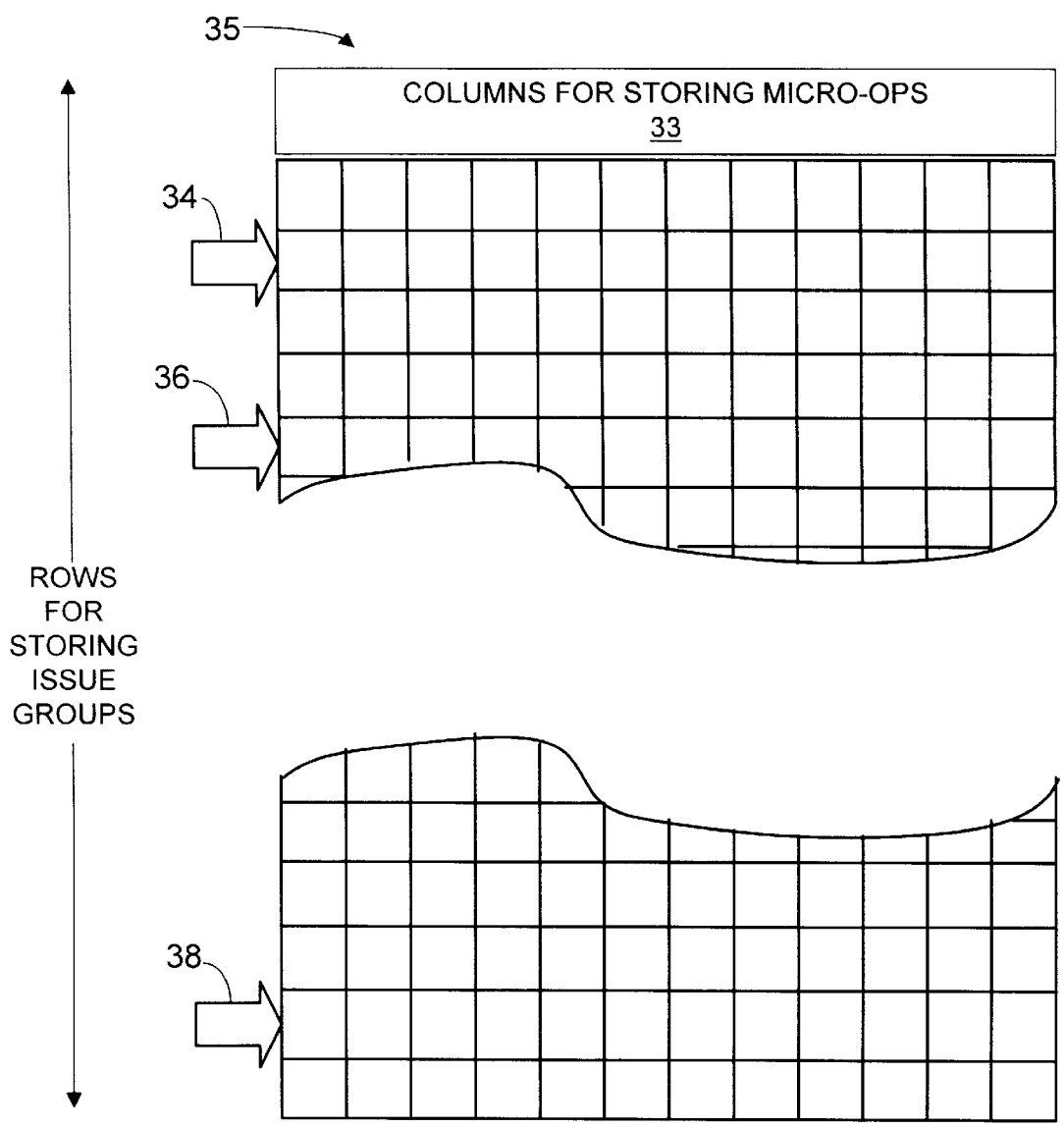
FIG. 2A depicts a first embodiment of a queue between the front and back ends of the pipeline illustrated in FIG. 1.

FIG. 2A illustrates one particular embodiment 35 of the queue 15 of FIG. 1. The queue 35 has enough columns 33 to feed several parallel execution ports or units (both not shown) of the back end 14. The processor 10 of FIG. 1 dispatches the micro-op of each column 33 of the queue 35 to a separate execution unit. In some embodiments, the number of columns 33 is equal to the number of parallel execution units in the processor pipeline 10. In other embodiments, the queue 35 only feeds a portion of the execution units. For example, one embodiment includes N parallel arithmetic logic units ("ALU's"), and the queue 35 has N columns 33, each column to feed a separate one of the ALU's.

Referring to FIG. 2A, the queue 35 includes one column per parallel execution unit, but other suitable structures may be employed. Some embodiments employ N queues 35 with each dispatching micro-ops to one execution unit. The queue 35 of FIG. 2A is a master queue, which stores the micro-ops for each execution unit in the back end 14.

Still referring to FIG. 2A, the queue 35 has enough rows to store the micro-ops of each unretired instruction in the back end 14. Each row of the queue 35 stores one issue group of micro-ops. In the queue 35, the micro-ops are not over-written until the macro-instructions from which they are decoded are retired. Thus, the queue 35 stores an intermediate state of the back end 14 of the pipeline 10. The intermediate state represents the micro-ops between the dispatch stage and the final or retired state. The back end 14 can be replayed from the intermediate state stored in the queue 35 without having to replay the entire pipeline 10.

Still referring to FIG. 2A, the queue 35 is circular and includes a head pointer 34. a tail pointer 36, and a replay pointer 38. The head pointer 34 points to the "head" of the queue 35, or the row where new micro-ops will be written to the queue 35. The tail pointer 36 points to the next row or issue group of micro-ops to be dispatched to the back end 14 for execution. The replay pointer 38 points to the row containing the first issue group of micro-ops to be dispatched in response to a replay request, which, in this particular embodiment, is the oldest, unretired issue group of the queue 35. To start a back end replay, the pipeline 10 copies the replay pointer 38 into the tail pointer 36. This repositions the tail pointer 36 so that micro-ops of the oldest unretired issue group become the next issue group dispatched from the queue 35.

In FIG. 2A, the head pointer 34 is incremented as new micro-ops are written to the queue 35. Similarly, as micro-ops are read from the queue 35, the tail pointer 36 is incremented. Finally, as each micro-op is retired, the replay pointer 38 is incremented. Micro-ops from retired instructions are over-written as the pointer 34 is incremented so that the rows of the queue 35 are reused. When one of the pointers 34, 36, or 38 reaches the last entry in the queue 35, the pointer is incremented to wrap around to the first entry in the queue 35 thereby making the queue 35 a circular buffer. In the embodiment of FIG. 2A, the tail pointer 36 typically trails the head pointer 34, and the replay pointer 38 trails the tail pointer 36.

Still referring to FIG. 2A, the queue 35 is empty when the head pointer 34 equals the replay pointer 38. In some embodiments, each of the head pointer 34 and the replay pointer 38 have an extra bit. If the head pointer 34 and the replay pointer 38 are equal and the extra bits are different, the queue 35 is full. If the head pointer 34 and the replay pointer 38 are equal and the extra bits are equal, the queue 35 is empty. In an alternate embodiment, one empty row is reserved for detecting a full queue condition, and the head pointer 34 is one less than the replay pointer 38 when the queue 35 is full. In some embodiments, the entire pipeline 10 is replayed when the queue 35 becomes full.

Figure 2B:
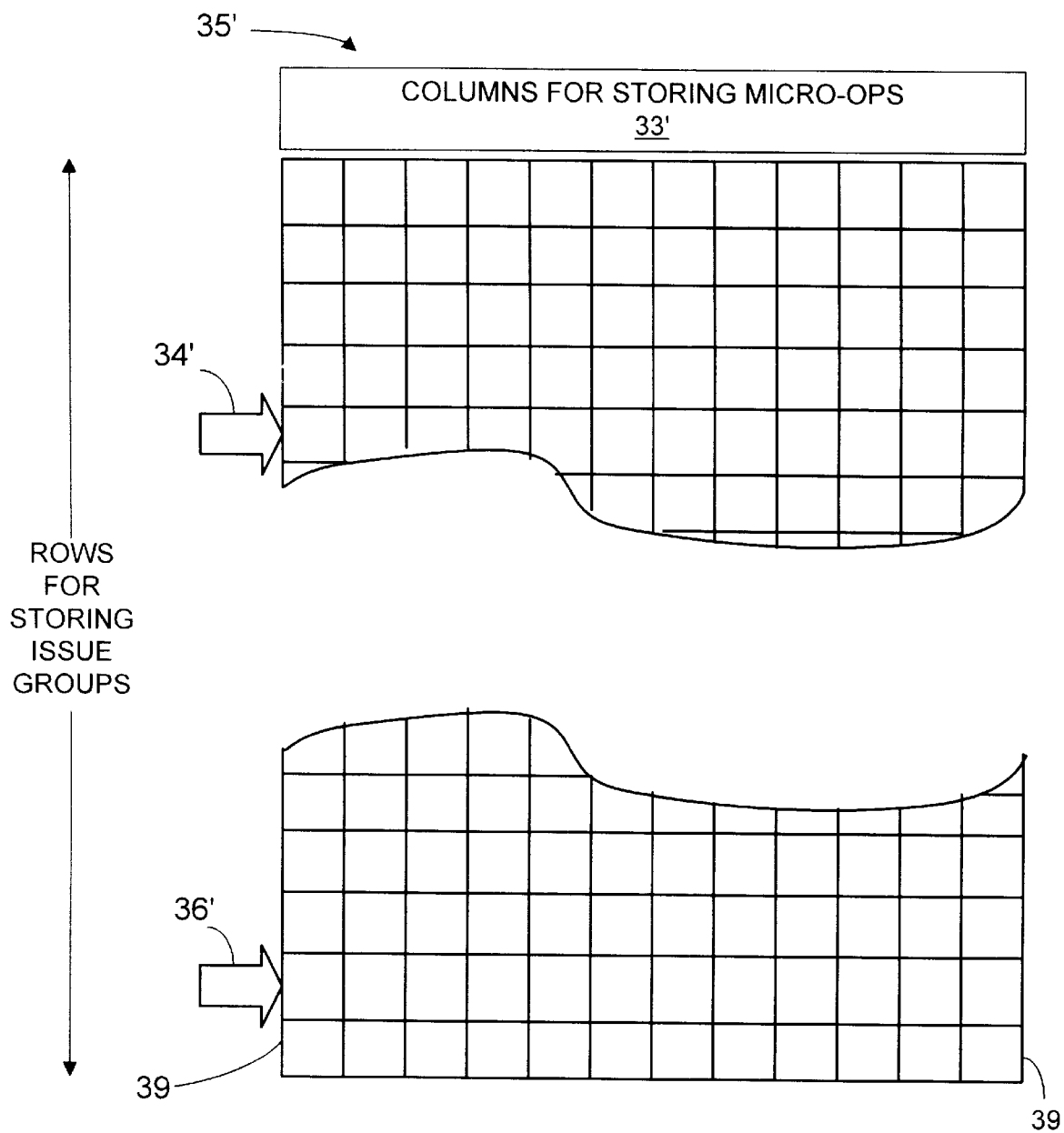
FIG. 2B depicts a second embodiment of a queue between the front and back ends of the pipeline illustrated in FIG. 1.

FIG. 2B illustrates a second embodiment 35' of the queue 15 of FIG. 1. Each column 33' of the queue 35' is a shift register. The queue 35' only uses head and tail pointers 34', 36' and physically shifts each row of micro-ops, i.e., each issue group, down in response to retiring a row of micro-ops. The oldest, unretired issue group of micro-ops is therefore at the bottom row 39 of the queue 35'. Thus, the replay pointer 38 of the embodiment of FIG. 2A is effectively the bottom row 39 of the queue 35'. Otherwise, the queue 35' of FIG. 2B functions similarly to the queue 35 of FIG. 2A.

Figure 3A:
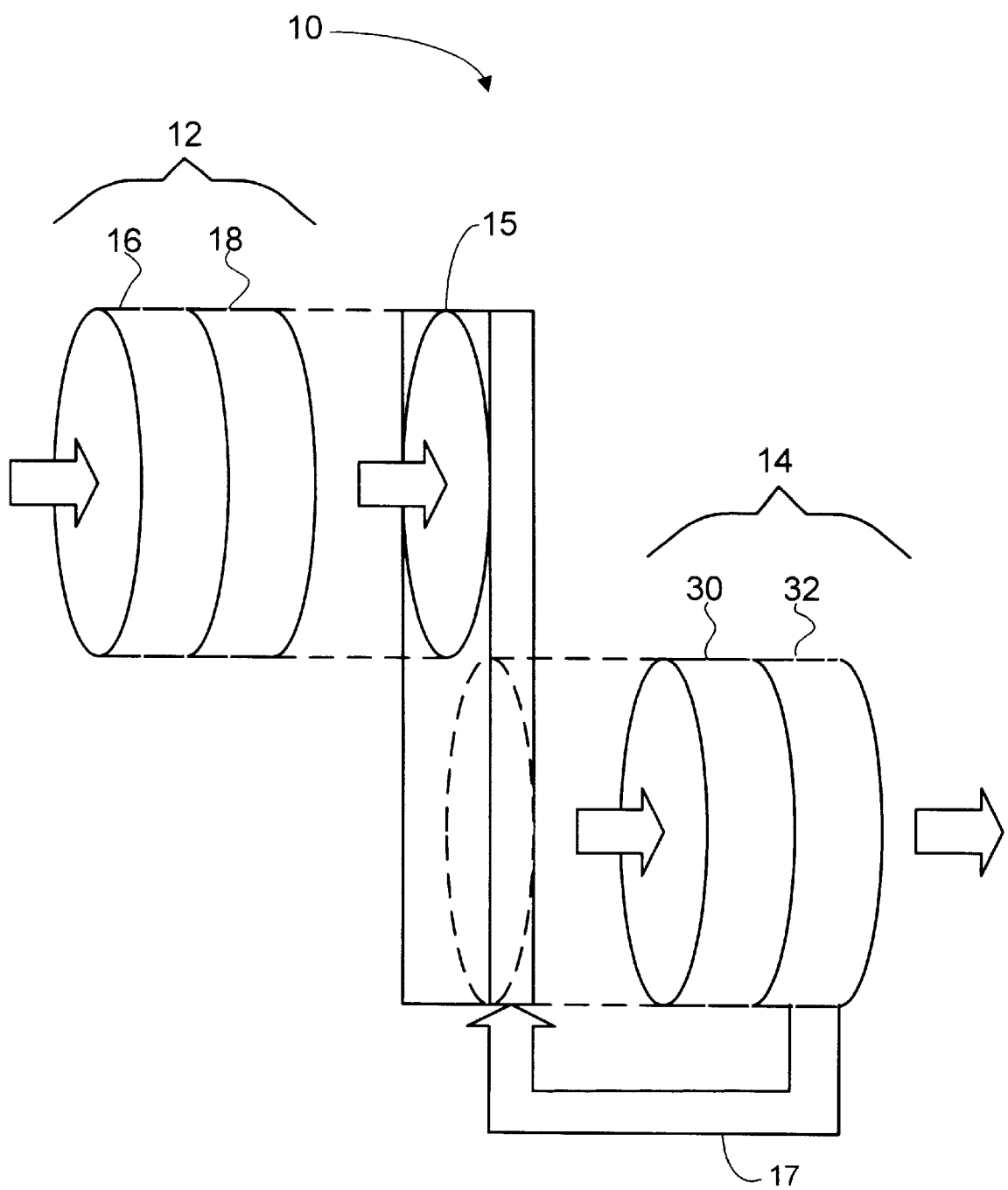
FIG. 3A conceptually illustrates one specific embodiment of the pipeline of FIG. 1.

Turning to FIG. 3A, the front end 12 of the non-stallable pipeline 10 of FIG. 1 includes, at least, fetch and decode stages 16, 18. The front end 12 may be of any suitable design known to the art as long as the front end 12 fetches macro-instructions from memory and writes the micro-ops into the queue 15. In the various embodiments, the front end 12 may include other stages and/or features.

Still referring to FIG. 3A, the back end 14 also includes several stages 30, 32 of processing. The back end 14 includes an execution stage 30 and a retirement stage 32. The back end 14 receives the micro-ops dispatched from the queue 15, executes the dispatched micro-ops, and retires executed instructions. The retirement stage 32 checks for and detects execution problems, i.e., exceptions. Alternative embodiments may include additional stages and features depending on the particular implementation.

Still referring to FIG. 3A, the stages 16, 18, 30, and 32 of the pipeline 10 above are merely representative and are neither exclusive nor exhaustive of stages that might be present in various alternative embodiments. Further, as those in the art will appreciate, the demarcations of stages 16, 18, 30, and 32 and functions in the processor pipeline 10 are not necessarily so crisp or distinct as might appear from FIG. 3A. The pipeline 10 in FIG. 1 is conceptualized for the sake of clarity in explaining the present invention. Thus, the precise structure of the front end 12 and the back end 14 in terms of stages is not pertinent to the practice of the invention.

Still referring to FIG. 3A, the back end 14 of the pipeline is non-stallable. Progress through the back end 14 is controlled by flip-flops and/or staged domino circuits (both not shown) that are free running. Making the back end 14 non-stallable, eliminates timing delays associated with operating a stall control network. By eliminating stall control networks, some embodiments can substantially increase the operating frequency of the pipeline 10. As used herein, the term "non-stallable" refers to a pipeline, or a portion thereof that is flushed and replayed in response to an execution problem rather than stalled. In some embodiments, the entire pipeline 10 is non-stallable.

Still referring to FIG. 3A, the back end 14 makes predictions that speculatively resolve data and control dependencies needed to execute the micro-ops. After execution, the micro-ops and results therefrom are temporarily stored to await commitment to an architectural state. Committing to the architectural state includes checking to determine whether problems occurred and whether the predictions were correct. Problem checking may be performed in any suitable manner known to the art and may be implementation specific. The precise manner in which problems are checked is not material to the present invention. If a problem or incorrect prediction is discovered, the speculative execution results are squashed or ignored. Then, the back end 14 of the pipeline 10 is flushed or drained, i.e., the pipeline 10 is either reset or all instructions in the back end 14 are allowed to complete execution and the registers are reset.

Exemplary problems in one particular embodiment include:

(1) a cache miss;

(2) a branch or predicate misprediction;

(3) an exception, such as a page fault or an illegal instruction;

(4) a translation look-aside register ("TLB") miss; and (5) certain data dependencies, such as load\store conflicts.

Also, some problems may be handled without back end replay in some embodiments. These variations are all implementation specific and not essential to the present invention.

Once a problem is detected, the problem and its effects are repaired. Again, the repair may be implementation specific. Exemplary problems and repair acts include:

(a) a predicate misprediction, the correct predicate must be inserted for the replay; or (b) a load store conflict, the store must be completed, the cache updated, and then the correct value loaded.

Problem repair can be quickly performed, because the queue 15 of FIG. 1 stores the intermediate state of the pipeline 10 of FIG. 1. Thus, the problem can be identified and corrected in the queue 15 and the execution stream replayed. The effects of the problem will be corrected in the replay.

Referring to FIG. 3A, the back end 14 is replayed from the micro-ops of the queue 15. The detection of an execution problem by the retirement stage 32 generates the replay request. The retirement stage 32 makes a replay request to the queue 15 over the channel 17. In the embodiment of FIG. 2A, the pipeline 10 copies the replay pointer 38 into the tail pointer 36 to start the replay. Then, execution of the micro-ops from the queue 15 recommences as described above. Detection of an execution problem also causes a flush of the back end 14 and of speculative execution results stored therein. Results from instructions located between the instruction with an execution problem and the replayed instructions are not committed to the architectural state.

Referring to FIG. 3A, the results of the re-execution are speculatively stored and checked for execution problems.

Although the problem causing the replay should not reoccur, other execution problems might arise. If a new problem is detected, another replay is requested as set forth above. The pipeline 10 eventually produces problem-free results that can be committed to an architectural state. Each iteration of replaying the back end 14 advances the issue group under consideration towards retirement of the instructions therein.

Figure 3B:
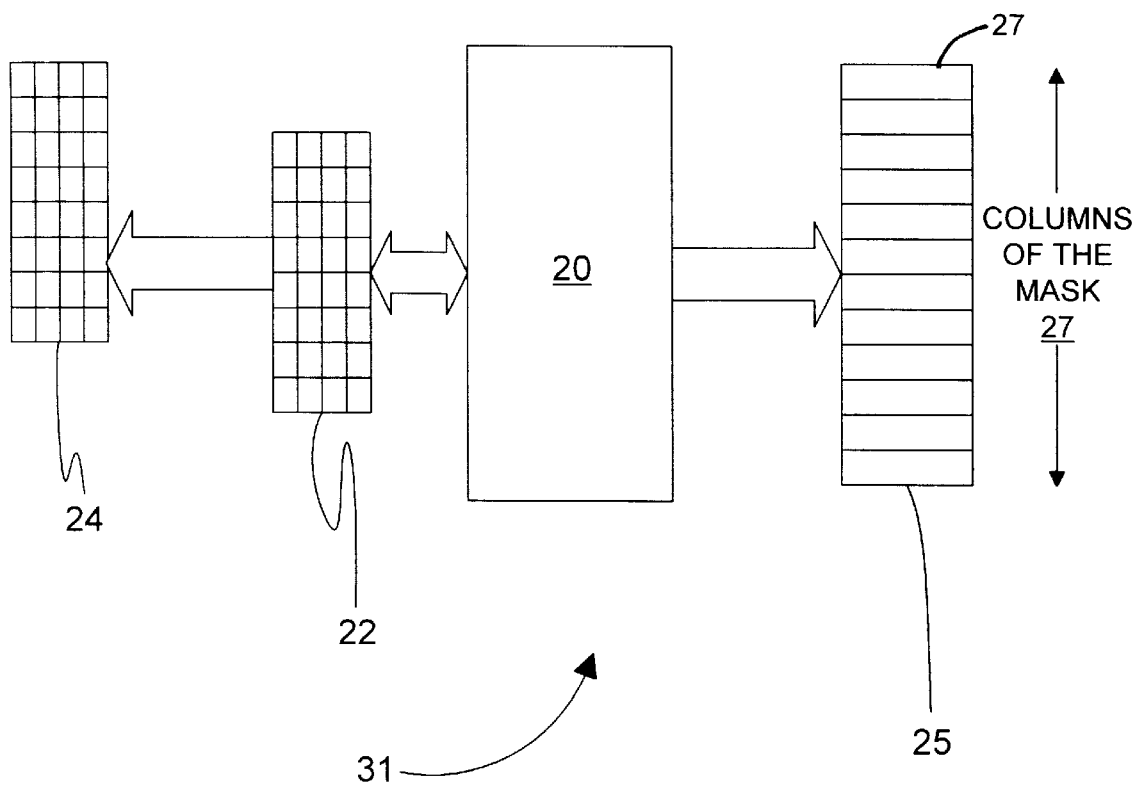
FIG. 3B illustrates one embodiment of the retirement stage of the pipeline of FIG. 3A.

FIG. 3B illustrates one embodiment of retirement hardware 31 for the retirement stage 32 of FIG. 3A. The retirement hardware 31 includes retirement logic 20, a speculative register file 22, an architectural register file 24, and may also include a mask 25. The results from executed instructions are temporarily stored in the speculative register file 22. The retirement logic 20 determines whether any execution problems occurred during the execution of the instructions corresponding to execution results stored in the speculative register file 22. If the retirement logic 20 determines that no execution problems occurred, the retirement logic 20 writes the execution results from the speculative register file 22 to the architectural register file 24 and retires the instruction. If the retirement logic 20 determines that a problem occurred, the retirement logic 20 institutes a back end replay instead of writing the results to the architectural register file 24.

Still referring to FIG. 3B, some embodiments employ a mask 25 so that "partial" pipeline replays may be performed in response to execution problems. A partial replay re-executes micro-ops of a portion of the columns of the queue 35 of FIG. 2A or of the queue 35' of FIG. 2B. Partial replays are performed in response to an execution problem on a micro-op belonging to the portion of the columns to be re-executed. The rows 27 of the mask 25 indicate columns of micro-ops that encountered execution problems or that potentially depend on micro-ops that encountered execution problems. For example, the mask 25 may enable replaying or re-executing the column of micro-ops sent to the individual execution unit registering the problem. Columns of instructions not dependent on the columns that encountered an execution problem may retire normally and may not be re-executed in a "partial" replay.

Still referring to FIG. 3B, the retirement logic 20 maintains a mask 25 to indicate which instructions encountered an execution problem. The mask 25 includes a series of 1's and 0's for indicating the particular instructions that encountered execution problems. After reading the mask 25, the retirement logic 20 orders replays of instructions from a subset of the columns 33 or 33' of FIGS. 2A or 2B. The subset of the columns to be re-executed may be a proper subset, i.e., less than all the columns 33 or 33'. In one embodiment, the queue 15 has N columns 33 that correspond to N parallel execution ports or units (not shown). In this embodiment, the mask 25 includes N binary digits, i.e., one binary digit for each parallel execution unit. The mask data is an index indicating the columns of the queue 15 and the execution ports where a problem occurred.

Referring to FIGS. 3B and 2A, the retirement logic 20 of one embodiment transmits the mask data and a replay request to the queue 35 in response to detecting an execution problem. In response to receiving the replay request, the tail pointer 36 of the queue 35 is repositioned as discussed above. Then, the replay proceeds selectively for the columns 33 of the queue 35 for which the mask data indicates execution problems occurred. Instructions from other columns are not re-executed.

Figure 4A:
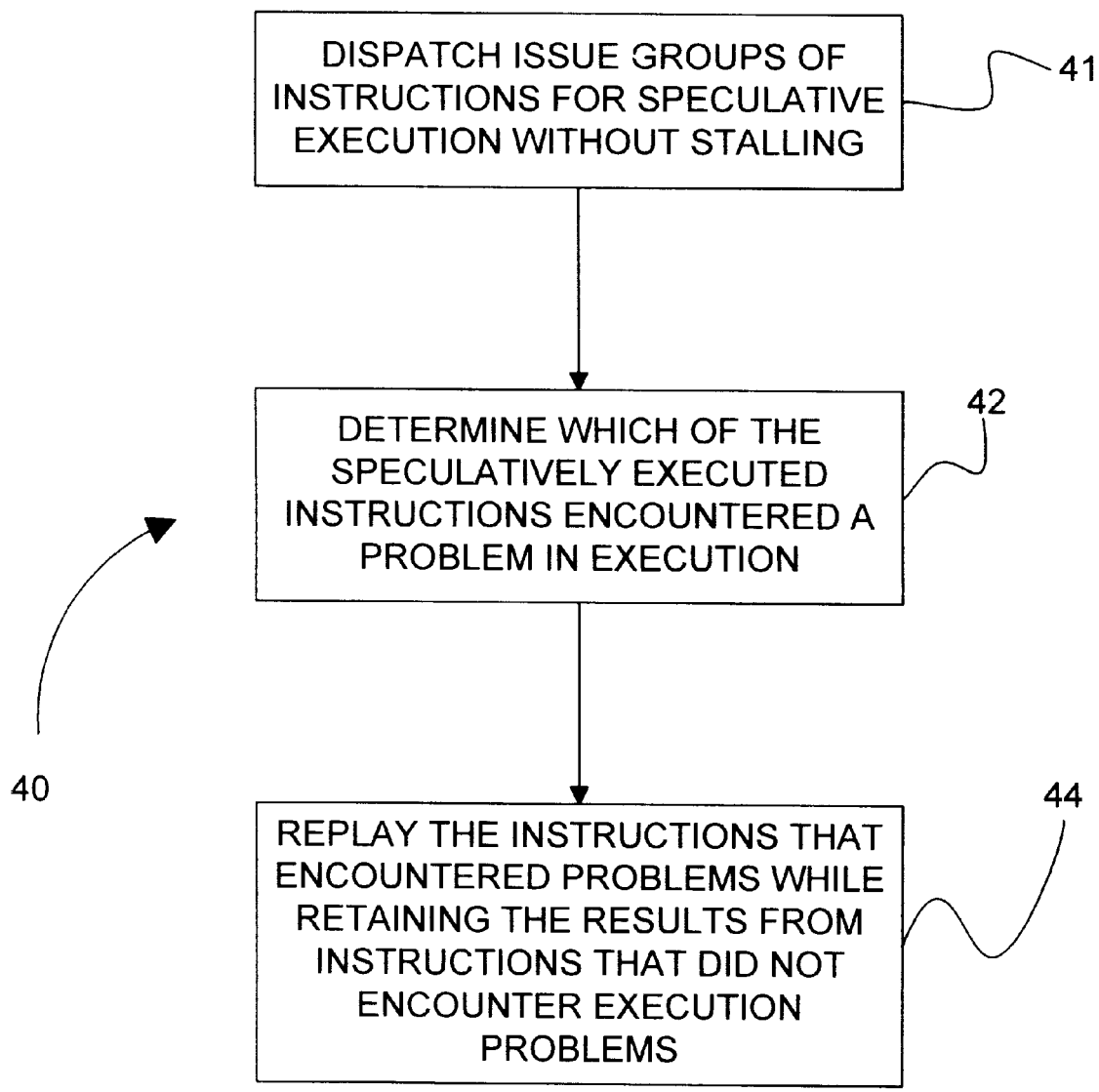
FIG. 4A illustrates an embodiment for a method of speculatively executing and retiring instructions in accord with the present invention.

FIG. 4A illustrates a method 40 of executing instructions in a back-end portion of a pipeline, e.g., the portion including the execution stages of the back end 14 of FIGS. 3A and/or 3B. In one embodiment, the back-end portion of the pipeline is nonstallable. At block 41, the pipeline 10 dispatches and executes a plurality of instructions in the back-end pipeline without determining whether stages of the pipeline are ready to receive the instructions. As an example of block 41, the pipeline 10 of FIG. 3A issues a plurality of issue groups sequentially from the queue 15 to the back end 14. The queue 15 dispatches instructions and the instructions are executed in the execution stage 30 without checking whether the various stages therein are ready. At block 42, the retirement stage 32 determines whether the executed instructions encountered an execution problem. For example, this step may entail determining whether an execution problem occurred in instructions of one issue group. At block 44, the queue 15 replays a portion of the executed instructions in response to determining that the portion encountered an execution problem. In some embodiments, the portion is a whole issue group. In other embodiments, the portion is proper subset of whole issue groups. In the later embodiment, the retirement stage 32 retains the results from the instructions that did not encounter problems committing execution results therefrom to an architectural state. In one embodiment, commitment entails writing the results to the architectural register file 24 of FIG. 3B.

Referring to FIGS. 3B and 4A, the method 40 is susceptible to variations. The results from the instructions executed without problems may be retained, in various alternative embodiments, by committing the results to an architectural register file 24 or by keeping the results in the speculative register file 22. In the latter case, the contents of the speculative register file 22 are committed to the architectural register file 24 in response to several instructions executing without problems.

Figure 4B:
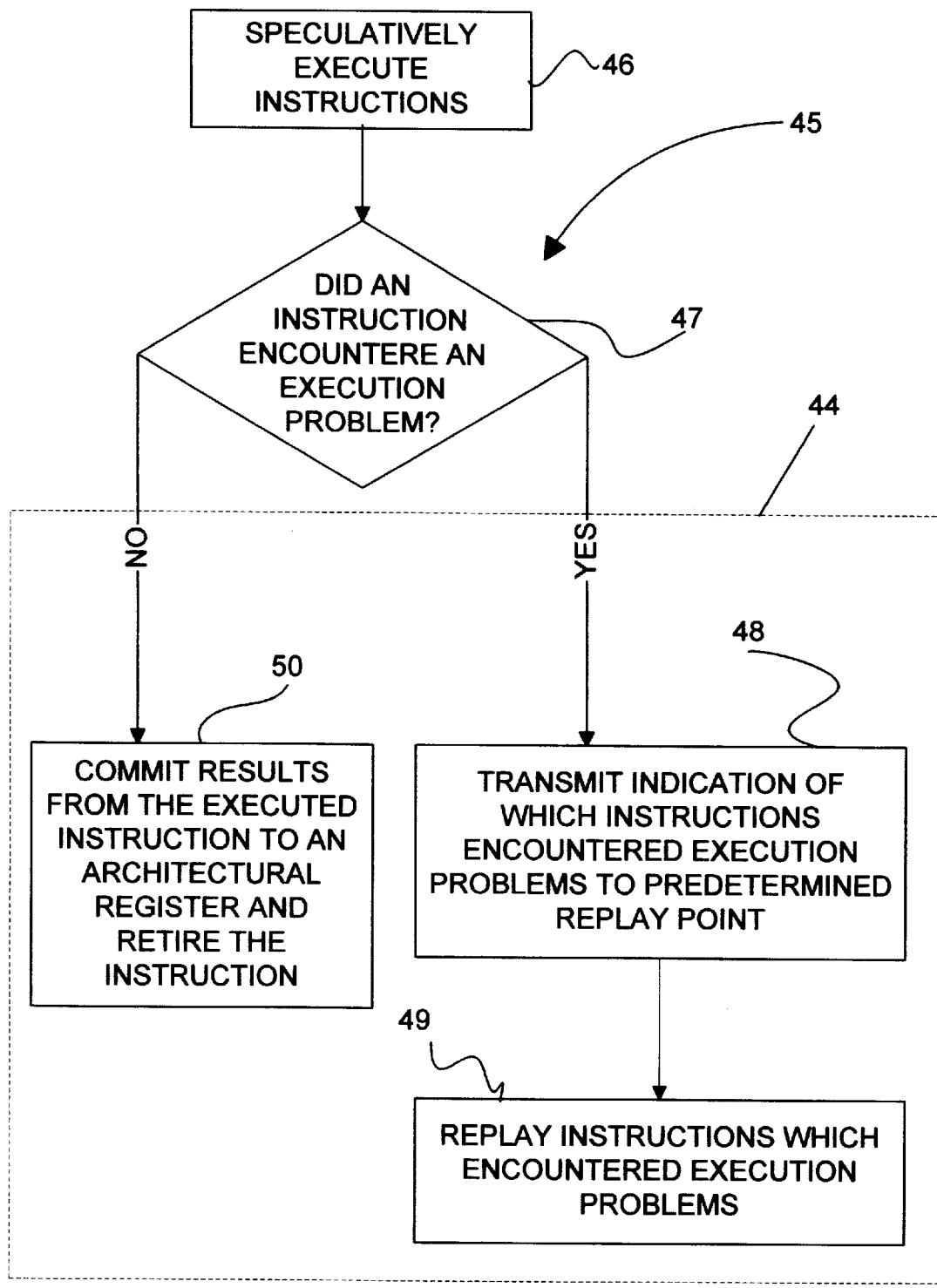
FIG. 4B illustrates another embodiment of a method for executing and retiring instructions in accord with the present invention.

FIG. 4B illustrates another method 45 for executing instructions in a nonstallable pipeline, e.g., the pipeline 10 of FIG. 3A. At block 46, the pipeline 10 speculatively executes an issue group of instructions. At block 47, the retirement stage 32 determines whether any instruction of the issue group encountered an execution problem. At block 48, the retirement logic 20 transmits an indication of which of the speculatively executed instructions encountered execution problems, to a predetermined replay point of the pipeline 10, e.g., by transmitting data from the mask 25. The replay point may be the queue 15 of FIGS. 1 and 3A. At block 49, the pipeline 10 replays the instructions which encountered execution problems, e.g., by dispatching the relevant instructions from the queue 15 to the execution units (not shown). At block 50, the retirement logic 20 of FIG. 3B commits results from instructions, which did not encounter execution problems, to the architectural register file 24 of FIG. 3B and retires these instructions.

The method of FIG. 4B may also include queuing the instructions at various points in the pipeline 10. For example, the instructions may be queued after decoding. Also, replaying the instructions that encountered an execution problem may entail replaying a portion of a processor pipeline, for example, a back end.

Referring again to FIGS. 3A, the instruction throughput of the processor pipeline 10 may be increased by replaying the back end rather than the entire pipeline 10. In some embodiments, replaying the entire processor pipeline 10 can use twice as many clock cycles as a back end replay, because the front end 12 of the processor pipeline 10 has a large number of stages. In such circumstances, the practice of the invention may cut the time spent in half by correcting execution problems through back end replay.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
    dispatching and executing a first and second plurality of instructions in a portion of a pipeline without first determining whether stages of the portion of the pipeline are ready;
    determining if an execution problem is encountered; and
    replaying the first plurality of instructions in response to determining that the first plurality of instructions encountered an execution problem.

2. The method of claim 1, comprising:
    retaining results from the second plurality of instructions in response to determining that the second plurality of instructions did not encounter an execution problem, and
    flushing results from the first plurality of instructions.

3. The method of claim 2, wherein the determining comprises checking for an execution problem in a single issue group of instructions.

4. The method of claim 2, comprising writing results from executing the second plurality of instructions from speculative registers to architectural registers in response to determining that the second plurality of instructions did not encounter an execution problem.

5. A method comprising:
    dispatching and executing an issue group of instructions in a back-end pipeline without determining whether stages of the back-end pipeline are ready to execute the instructions;
    determining whether the instructions of the issue group encountered an execution problem;
    indicating which of the instructions of the issue group encountered an execution problem to a replay point in the pipeline; and
    re-dispatching the indicated instructions of the issue group from the replay point for re-execution.

6. The method of claim 5, wherein the indicating comprises sending mask data to the replay point.

7. The method of claim 6, wherein the mask data indicates which instructions of an oldest unretired issue group encountered an execution problem.

8. The method of claim 6, wherein the re-dispatching comprises sending the indicated instructions to a proper subset of execution ports of the back-end pipeline, the mask data indicating the proper subset of the execution ports.

9. The method of claim 5, wherein the dispatching comprises sending the issue group of instructions from a queue to parallel execution ports.

10. The method of claim 9, wherein the re-dispatching comprises re-sending from the queue unretired instructions that have been dispatched to same execution ports as the indicated instructions.

11. The method of claim 9, wherein the indicating comprises sending mask data from a retirement stage to the queue, the mask data indicating execution ports for instructions that have encountered an execution problem; and
    wherein the re-dispatching comprises re-executing unretired instructions that have been dispatched to the indicated execution ports.

12. A method comprising:
    sending a plurality of instructions through a sequence of stages of a pipelined processor for execution without determining whether the stages are ready to receive the instructions;
    determining which of the plurality of instructions were executed without problem;
    indicating which of the plurality of instructions encountered an execution problem to a replay point of the pipelined processor; and
    replaying the instructions indicated to have encountered an execution problem from the replay point.

13. The method of claim 12, comprising storing consecutive issue groups of instructions in rows of a queue;
    wherein the sending comprises sequentially sending the issue groups from the queue to parallel execution ports.

14. The method of claim 12, wherein the indicating comprises transmitting mask data from a retirement stage to a queue from which issue groups of instructions are sent to the sequence of stages, the mask data indicating instructions that encountered an execution problem.

15. The method of claim 14, wherein the mask data indicates instructions of an oldest unretired issue group that encountered an execution problem.

16. A processor pipeline comprising:
    a front end to fetch a plurality of instructions for execution;
    a back end to execute the plurality of instructions fetched by the front end, the back end comprising a retirement stage to determine if an instruction encountered an execution problem, the back end being non-stallable; and
    a channel to send an indication that an instruction encountered an execution problem from the retirement stage to a replay point from which the indicated instruction may be re-executed.

17. The processor pipeline of claim 16, wherein the indication comprises a mask to indicate instructions that encountered an execution problem.

18. The processor pipeline of claim 16, wherein the replay point comprises a queue to store instructions from the front end for dispatch to the back end for execution.

19. The processor pipeline of claim 18, wherein the queue is to store an intermediate state of the back end, the intermediate state comprising instructions dispatched for execution but unretired.

20. The processor pipeline of claim 19, wherein the queue comprises:
- a plurality of rows, each row to store an issue group of instructions from the front end;
- a first pointer to a next one of the rows to store a next issue group of instructions; and
- a second pointer to a next row of instructions to be dispatched from the queue.

21. A processor pipeline comprising:
- a front end;
- a back end, the back end being non-stallable;
- a queue to receive instructions from the front end to store an intermediate state of the processor pipeline for replaying by the back end; and
- a channel over which the back end can request a replay from the queue.

22. The processor pipeline of claim 21, wherein the front end comprises at least one of a fetch stage and a decode stage.

23. The processor pipeline of claim 21, wherein the queue comprises:
- a plurality of rows, each row to store one issue group of unretired micro-ops received from the front end;
- a first pointer to a next row to store micro-ops in the queue; and
- a second pointer to a next row of micro-ops to be dispatched to the back end.

24. The processor pipeline of claim 21, wherein the queue comprises a circular buffer or a plurality of shift registers.

25. The processor pipeline of claim 21, wherein the back end comprises an execution stage having a plurality of parallel execution ports; and
wherein the queue has one column for each execution port, each execution port to receive instructions from one of the columns.

26. The processor pipeline of claim 25, comprising a retirement stage to send a mask to the queue in response to determining an instruction has encountered an execution problem to indicate which of the columns to replay.

27. A processor pipeline comprising:
- a front end to prepare instructions for execution;
- a back end having a plurality of parallel execution units;
- a queue to receive instructions from the front end to store an intermediate state of the processor pipeline for replaying by the back end; and
- a channel over which the back end may request a partial replay from the queue.

28. The processor pipeline of claim 27, wherein the queue comprises:
- a plurality of rows, each row to store one issue group of unretired micro-ops received from the front end;
- a first pointer to a next row to store micro-ops in the queue; and
- a second pointer to a next row of micro-ops to be dispatched to the back end; and
- wherein the queue has one column for each execution unit, each execution unit to receive micro-ops from one of the columns.

29. The processor pipeline of claim 28, comprising a retirement stage to send a mask to the queue in response to determining an execution problem has been encountered to indicate which of the columns to replay.

* * * * *